United States Patent Office 3,574,125
Patented Apr. 6, 1971

3,574,125
DETERGENT CONCENTRATE
Nicolaas A. I. van Paassen, Rijswijk, Netherlands, assignor to Chem-Y Fabriek van Chemische Produkten N.V., Bodegraven, Netherlands
No Drawing. Filed Dec. 26, 1967, Ser. No. 693,169
Claims priority, application Great Britain, Dec. 29, 1966, 58,173/66
Int. Cl. C11d 1/12
U.S. Cl. 252—161                       11 Claims

ABSTRACT OF THE DISCLOSURE

Anionic capillary-active ether sulfates are rendered readily soluble in water at ambient temperatures by adding as an additive an external plasticizer for polymers, such as a phthalate, phosphate or stearate ester, and/or a suitable hydrotropic agent, such as oxyethylation products of higher alcohols or alkyl phenols, and with or without a water-miscible alcohol.

---

This invention relates to detergents, more specifically to anionic detergents in concentrated form and preferably to hydrocarbon-polyether-sulfates in concentrated form.

Most anionic detergents, and especially the abovementioned class of polyethersulfates present the inconvenience that once they have been brought into a concentrated form, they cannot be brought simply into solution again with cold water. Such concentrated detergents are usually solids or pastes which can only be redissolved in hot or boiling water. However, it is extremely unpractical to treat whole drums of detergent with boiling water, and accordingly these detergents have to be shipped from their places of production in a relatively diluted form, which in turn means that the cost of shipment and other transportations is unnecessarily and uneconomically high.

A typical group of these detergents is constituted by the compounds of the formula $RO—(C_2H_4O)_nSO_3X$, wherein RO is the residue of an alcohol or acid having a hydrophobic hydrocarbon group, such as an alkyl group having 8–20 carbon atoms or an alkylphenyl group having 4–18 carbon atoms in the alkyl moiety, $n$ is a number having an average value of 1 to 30 or more, and X is a cation. An example thereof is a detergent which is prepared from a commercial lauryl alcohol (a mixture of about 70% of $C_{12}$ and about 30% of $C_{14}$ alcohol) by reacting this alcohol with ethylene oxide, sulfating the ethylene oxide adduct, and neutralizing the sulfation product e.g. with NaOH. Such products are usually shipped as solutions which in the case of the abovementioned sodium lauryl polyether sulfate contain a maximum of 28% of the capillary-active product, because at higher concentrations the buyer needs large amounts of hot or even boiling water in order to obtain a clear solution of the product within a reasonable time, and to remove the product from the drums wherein it has been shipped.

Accordingly, it is an object of the invention to obtain more concentrated forms of such products which can still simply be dissolved in cold water.

It is a further object to promote the dissolving rate in water of anionic detergents in general.

A still further object of the invention is to provide anionic detergent concentrates which are readily soluble in water, to form solutions which are either completely clear, or else show only a little haziness.

Surprisingly, it has now been found that these objects can be accomplished by adding substances which are normally used as external plasticizers for artificial resins, optionally with further adjuvants.

External plasticizers are substances which are incorporated into a polymer composition without forming a part of the polymer molecule, and they should be well discerned from internal plasticizers which exert their plasticizing action as a part of the polymer molecule.

Examples of usual external plasticizers are phthalate, phosphate and stearate esters.

Additions of a few percents of plasticizers are generally sufficient to obtain a product which can be dissolved quickly in cold water.

Most plasticizers are themselves only moderately water-soluble, and accordingly in some cases the product does dissolve quickly in cold water, but the obtained solution is somewhat hazy. Although in many cases such a haziness will not constitute a serious problem for the ultimate use of the product, it can be prevented by adding also a small quantity of suitable hydrotropic agent to the concentrate, particularly a non-ionic surfactant of a suitable HLB value (HLB is the hydrophilic lyophilic balance which can be calculated, vide e.g. Journal of the Society of Cosmetic Chemists, 1954, pages 249–246).

The surprizing discovery was then made that the addition of such a hydrotropic agent often still further reduced the time necessary for dissolution of the product in cold water, and still more surprisingly it was then found that such a hydrotropic agent can also be used per se for the present purpose.

The mechanisms by which the plasticizers and the hydrotropic agents exert their favorable effects on the dissolution rate are not understood. In this respect it should be noted that the anionic capillary-active agent per se are perfectly water-soluble, and that only the dissolving velocity forms a problem in some cases. It is highly surprising that this dissolution velocity can be improved by adding plasticizer which in itself is much less water-soluble than the anionic capillary-active agent. Neither is it understood how the hydrotropic agent functions to accelerate the dissolution process. Such a hydrotropic agent is used for improving the solubility of substances which per se are not sufficiently water-soluble, i.e. hydrophilic. The HLB values of these agents is usually not over 15 to 20, whereas the anionic capillary-active agents have much higher HLB values, i.e. are much more hydrophilic, and it is not clear how the dissolution process of such hydrophilic products can be accelerated by agents which are less hydrophilic.

Particularly suitable hydrotropic agents are the oxyethylation products of higher alcohols (i.e. alcohols of 8 or more, particularly 8–20 carbon atoms), and of alkylphenols containing at least 4 carbon atoms in the alkyl moiety.

It is known to add water-miscible alcohols, such as ethyl alcohol, to detergent concentrates, in order to lower the viscosity of their solutions, and this measure can also be applied successfully in the present case, although in general the addition of alcohol is not strictly necessary.

Accordingly, this invention provides a concentrate of an anionic capillary-active agent which can be readily dissolved in water at ambient temperatures, said concentrate being characterized by the fact that it contains a minor amount of an additive chosen from the group consisting of (a) external plasticizers for polymers, (b) non-ionic hydrotropic agents, (c) mixtures of (a) and (b); (d) mixtures of (a) and a water-miscible alcohol; (e) mixtures of (b) and a water miscible alcohol and (f) mixtures of (c) and a water miscible alcohol.

The amount of additive can vary within relatively wide limits; preferably, the concentrate contains not less than 0.5% and not more than 8% the present additive, based on the weight of the concentrate.

It should be noted specifically that although the additives of this invention have their greatest utility for use in concentrates which without such an additive dissolve too slowly in cold water for practical purpose, the additives are also useful in concentrates which per se have a dissolution velocity which is sufficient for practical purposes, because even in such cases the present additives still further accelerate the dissolution process.

The concentrates of this invention preferably have a content anf anionic capillary-active agent of at least 40% by weight.

The invention is further illustrated by the following examples which show some representative embodiments, without, however, the invention being limited thereto.

In Examples 1–17 an anionic detergent was used which was prepared as follows:

One mole of lauryl alcohol (technical grade, about 70% of $C_{12}$ and about 30% of $C_{14}$ alcohol) is reacted with 2.2 moles of ethylene oxide and the so obtained condensate is sulfated and then neutralized with NaOH.

A concentrate of the so obtained anionic detergent was prepared containing 56% by weight of the detergent and 44% by weight of water. This concentrate has a pasty to solid consistency. In a laboratory experiment it was tried to dissolve 25 parts by weight of this concentrate in 75 parts by weight of ordinary tap water which at that time of the year had a temperature of about 12° C. The dissolving operation took about 50 minutes which, of course, is unacceptable for commercial purposes, especially so when much larger quantities are involved.

In the following experiments this same concentrate is indicated with "Salvo PA" for the sake of shortness. Mixtures with additives are prepared, and each mixture is dissolved in three times its weight of plain cold tap water. The time necessary for complete dissolution is measured in each case. Parts are by weight EO=oxyethylene unit.

EXAMPLE 1

| | Parts |
|---|---|
| Salvo PA | 99 |
| Dibutyl phthalate | 1 |

Dissolving time 11 minutes; solution is hazy.

EXAMPLE 2

| | Parts |
|---|---|
| Salvo PA | 98 |
| Dibutyl phthalate | 1 |
| Nonylphenol-$EO_{10.5}$ (HLB value 13.2) | 1 |

Dissolving time 9 minutes; solution is somewhat hazy.

EXAMPLE 3

| | Parts |
|---|---|
| Salvo PA | 97 |
| Dibutyl phthalate | 1 |
| Nonylphenol-$EO_{10.5}$ | 2 |

Dissolving time 7 minutes; solution is clear.

It appears from the above Examples 1–3 that dibutyl phthalate, a commercial plasticizer for artificial resins, shortens the dissolution time to an acceptable value, but gives rise to a hazy solution. This haziness is caused by the low solubility of the dibutyl phthalate, and as shown in Examples 2 and 3, is removed by adding a sufficient quantity of a hydrotropic agent. At the same time, this hydrotropic agent gives a further shortening of the dissolution time. A still further shortening of this time is obtained by adding ethanol, as shown in Example 4.

EXAMPLE 4

| | Parts |
|---|---|
| Salvo PA | 95 |
| Dibutyl phthalate | 1 |
| Nonylphenol-$EO_{10.5}$ | 2 |
| Ethanol | 2 |

Dissolving time 5 minutes; clear solution.

The influence of the HLB value of the optionally uused hydrotropic agent appears from the following examples.

EXAMPLE 5

| | Parts |
|---|---|
| Salvo PA | 95 |
| Dibutyl phthalate | 1 |
| Ethanol | 2 |
| Laurylalcohol-$EO_6$ (HLB value 11.5) | 2 |

Dissolving time 20 minutes; clear solution.

EXAMPLE 6

| | Parts |
|---|---|
| Salvo PA | 95 |
| Dibutyl phthalate | 1 |
| Ethanol | 2 |
| Laurylalcohol-$EO_7$ (HLB value 12.2) | 2 |

Dissolving time 13 minutes; clear solution.

EXAMPLE 7

| | Parts |
|---|---|
| Salvo PA | 95 |
| Dibutyl phthalate | 1 |
| Ethanol | 2 |
| Laurylalcohol-$EO_9$ (HLB value 13.4) | 2 |

Dissolving time 11 minutes; clear solution.

EXAMPLE 8

| | Parts |
|---|---|
| Salvo PA | 95 |
| Dibutyl phthalate | 1 |
| Ethanol | 2 |
| Laurylalcohol-$EO_{10}$ (HLB value 13.8) | 2 |

Dissolving time over 20 minutes; clear solution.

Butyl stearate is also a commercial plasticizer, and it has a somewhat less poor water-solubility than dibutyl phthalate, as appears from the following example.

EXAMPLE 9

| | Parts |
|---|---|
| Salvo PA | 99 |
| Butyl stearate | 1 |

Dissolving time 6 minutes; clear solution.

Accordingly, the addition of 1% of butyl stearate is quite sufficient. When more butyl stearate is added the poor-water-solubility of the plasticizer exerts its influence. On the other hand, the dissolving time of the above example can be improved still by adding hydrotropic agents. This is illustrated in Examples 10 and 11.

EXAMPLE 10

| | Parts |
|---|---|
| Salvo PA | 98 |
| Butyl stearate | 2 |

Dissolving time 6 minutes; hazy solution.

EXAMPLE 11

| | Parts |
|---|---|
| Salvo PA | 95 |
| Butyl stearate | 1 |
| Nonylphenol-$EO_{10.5}$ | 2 |
| Ethanol | 2 |

Dissolving time 4 minutes; clear solution.

A still better water soluble plasticizer is tri(butoxyethyl) phosphate. This plasticizer can also be used in combination with hydrotropic agents and even in combination with a little additional water. These embodiments are shown in the following examples.

EXAMPLE 12

| | Parts |
|---|---|
| Salvo PA | 97 |
| Tri(butoxyethyl)phosphate | 1 |
| Nonylphenol-$EO_{10.5}$ | 2 |

Dissolving time 10 minutes; clear solution.

EXAMPLE 13

| | Parts |
|---|---|
| Salvo PA | 95 |
| Tri(butoxyethyl)phosphate | 1 |
| Oleylalcohol-EO$_{12}$ (HLB value 13.4) | 2 |

Dissolving time 7 minutes; clear solution.

EXAMPLE 14

| | Parts |
|---|---|
| Salvo PA | 95 |
| Tri(butoxyethyl)phosphate | 2 |
| Water | 3 |

Dissolving time 5 minutes; clear solution.

It is also possible to shorten the dissolution time by using exclusively a non-ionic surfactant without a plasticizer, but, if desired, in combination with an alcohol. In this embodiment the HLB value of the non-ionic surfactant should be within rather narrow limits, depending on the nature of the anionic detergent, the possible other constituents of the mixture and their mutual proportions. The following examples illustrate this embodiment.

EXAMPLE 15

| | Parts |
|---|---|
| Salvo PA | 98 |
| Nonylphenol-EO$_{10.5}$ | 2 |

Dissolving time over 20 minutes; clear solution.

EXAMPLE 16

| | Parts |
|---|---|
| Salvo PA | 96 |
| Nonylphenol-EO$_{10.5}$ | 4 |

Dissolving time 8 minutes; clear solution.

EXAMPLE 17

| | Parts |
|---|---|
| Salvo PA | 99 |
| Oleylalcohol-EO$_9$ (HLB value 12.1) | 1 |

Dissolving time 6 minutes; clear solution.

EXAMPLE 18

The condensate of technical grade lauryl alcohol with ethylene oxide (1:2.2) is sulfated, and this one neutralized with diethylamine. In the pure state this diethylamine salt is a viscous liquid which in practice has to be dissolved in hot to boiling water and then still takes an hour or more for complete dissolution, unless salt is added (vide British patent specification 891,631). This 100% detergent is used in the following experiment:

| | Parts |
|---|---|
| Diethylamine salt | 95 |
| Nonylphenol-EO$_{10.5}$ | 2 |
| Ethanol | 2 |
| Dibutyl phthalate | 1 |

Dissolving time in water of about 30° C.: 23 minutes; clear solution.

EXAMPLE 19

The process of this invention even provides an improvement of the dissolution rate in cases, where this rate per se is not insufficient. The surfactant

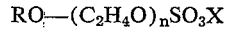
lauryl—O—C$_2$H$_4$O—CH$_2$—COONa in undiluted form needs 8 minutes for complete dissolution in water of room temperature. This surfactant was used in the following experiment:

| | Parts |
|---|---|
| Lauryl—O—C$_2$H$_4$O—CH$_2$COONa | 95 |
| Nonylphenol-EO$_{10.5}$ | 2 |
| Ethanol | 2 |
| Dibutyl phthalate | 1 |

Dissolution time 5 minutes; clear solution.

EXAMPLE 20

A commercial product is used, consisting of a 56% solution of sodium lauryl(EO)$_{2.2}$ sulfate to which 3% isopropanolamide of lauric acid has been added as foam improver, as well as some alcohol to counteract the large rise in viscosity caused by the isopropanolamide.

This commercial product needs 15 minutes for complete dissolution of water at room temperature.

The following mixture is prepared:

| | Parts |
|---|---|
| Above-described commercial product | 95 |
| Nonylphenol-EO$_{10.5}$ | 2 |
| Ethanol | 2 |
| Dibutyl phthalate | 1 |

Dissolving time 6½ minutes, clear solution.

EXAMPLE 21

Another commercial product is a 59% solution of a mixture of sodium lauryl (EO)$_{2.2}$ sulfate and the monoethanolamine salt of dodecylbenzenesulfonic acid to which 3% of the isopropanolamide of lauric acid has been added. This commercial product needs only 4 minutes for complete dissolution in water at room temperature.

To the above product are added 1.2% of nonylphenol-EO$_{10.5}$, 1.2% of ethanol and 0.6% of dibutyl phthalate. The time needed for complete dissolution in water of room temperature is now only 2 minutes, i.e. it has decreased with 50%.

It appears from the above Examples 20 and 21 that the principles of the invention are also applicable to more or less complex commercial products.

EXAMPLE 22

A 75% solution of triethanolamine lauryl-sulfate needs 16 minutes for complete dissolution in water of room temperature.

The following mixture is prepared:

| | Parts |
|---|---|
| Above-mentioned 75% solution | 95 |
| Nonylphenol-EO$_{10.5}$ | 2 |
| Ethanol | 2 |
| Dibutyl phthalate | 1 |

Dissolution time 11 minutes, clear solution.

This example shows that the advantages of the invention are also obtained when applied to nonoxyethylated capillary-active sulfates.

What I claim is:

1. A concentrate consisting essentially of an anionic aliphatic capillary-active sulfate or carboxylate which can be readily dissolved in water at ambient temperatures and selected from the group consisting of dodecylbenzene sulfonates, monoethoxylated lauryl alcohol carboxylates and ethoxylated alcohol sulfates of the formula $$RO—(C_2H_4O)_nSO_3X$$

wherein RO is the residue of an alcohol or acid having a hydrophobic hydrocarbon group selected from the group consisting of alkyl having 8–20 carbon atoms and alkylphenyl having 4–18 carbon atoms in the alkyl moiety, $n$ is a number having an average value of 1 to about 30, and X is a cation, and 0.5 to 8% by weight based on the weight of the capillary-active compound of an additive selected from the group consisting of: (a) mixtures of 1 to 2 parts of non-ionic hydrotropic ethoxylated products of higher alcohols or of alkyl phenols and having 2–12 ethylene oxide units, and 1 part of a compound normally useful as an external plasticizer for polymers selected from the group consisting of tri(butoxyethyl) phosphate, dibutyl phthalate, and butyl stearate; and (b) mixtures of (a) and a monohydric water-miscible alcohol.

2. A concentrate consisting essentially of capillary-active ether sulfates of the formula RO—(C$_2$H$_4$O)$_n$SO$_3$X, wherein RO is the residue of an alcohol or acid having a hydrophobic hydrocarbon group selected from the group consisting of alkyl having 8–20 carbon atoms and alkylphenyl having 4–18 carbon atoms in the alkyl moiety, $n$ is a number having an average value of 1 to about 30, and X is a cation which sulfates can be readily dissolved in water at ambient temperatures, and 0.5–8% by weight of an additive selected from the group consisting of: (a) mixtures of 1 to 2 parts of a non-ionic hydrotropic ethoxylation product of higher alcohols or of alkyl phenols and having 2–12 ethylene oxide units and 1 part of a compound normally useful as an external plasticizer for polymers selected from the group consisting of tri(butoxyethyl) phosphate, dibutyl phthalate, and butyl stearate; and (b) mixtures of (a) and a monohydric water-miscible alcohol.

3. A water concentrate consisting essentially of at least 40% by weight of an anionic aliphatic capillary-active sulfate or carboxylate which can be readily dissolved in additional water at ambient temperatures and selected from the group consisting of dodecylbenzene sulfonates, monoethoxylated lauryl alcohol carboxylates and ethoxylated alcohol sulfates of the formula $$RO-(C_2H_4O)_nSO_3X$$

wherein RO is the residue of an alcohol or acid having a hydrophobic hydrocarbon group selected from the group consisting of alkyl having 8–20 carbon atoms and alkylphenyl having 4–18 carbon atoms in the alkyl moiety, $n$ is a number having an average value of 1 to about 30, and X is a cation, and 0.5–8% by weight based on the weight of the capillary-active compound of an additive selected from the group consisting of: (a) mixtures of 1 to 2 parts of a non-ionic hydrotropic ethoxylation product of a higher alcohol or of an alkyl phenol and having 2–12 ethylene oxide units and 1 part of a compound normally useful as an external plasticizer for polymers selected from the group consisting of tri(butoxyethyl) phosphate, dibutyl phthalate and butyl stearate; and (b) mixtures of (a) and a monohydric water-miscible alcohol.

4. A concentrate according to claim 1, characterized by the fact that said plasticizer is dibutyl phthalate.

5. A concentrate according to claim 1, characterized by the fact that said plasticizer is butyl stearate.

6. A concentrate according to claim 1, characterized by the fact that said plasticizer is tri(butoxyethyl) phosphate.

7. A concentrate according to claim 1, characterized by the fact that said hydrotropic agent is selected from the group consisting of oxyethylated higher alcohols of 8–20 carbon atoms, and oxyethylated higher alkylphenols, of at least 4 alkyl carbon atoms, having an hydrophilic-lyophilic balance (HLB) less than 20.

8. A concentrate according to claim 7, characterized by the fact that said hydrotropic agent is an oxyethylated nonylphenol containing an average of from 10 to 11 oxyethylene units.

9. A concentrate according to claim 6, characterized by the fact that said hydrotropic agent is an oxyethylated lauryl alcohol having an average of from 6 to 10 oxyethylene units.

10. A concentrate according to claim 6, characterized by the fact that said hydrotropic agent is an oxyethylated oleyl alcohol having from 9 to 12 oxyethylene units.

11. A concentrate according to claim 1, characterized by the fact that said water-miscible alcohol is ethanol.

References Cited

UNITED STATES PATENTS

| 3,029,205 | 4/1962 | Henderson et al. | 252—161 |
| 3,140,261 | 7/1964 | Noad | 252—161 |

FOREIGN PATENTS

| 241,460 | 1/1961 | Australia | 252—161 |
| 730,461 | 5/1955 | Great Britain | 252—161 |
| 1,031,329 | 3/1953 | France | 252—161 |

LEON D. ROSDOL, Primary Examiner

P. E. WILLIS, Assistant Examiner

U.S. Cl. X.R.

252—138